US011737060B2

(12) United States Patent
Zhang et al.

(10) Patent No.: US 11,737,060 B2
(45) Date of Patent: Aug. 22, 2023

(54) METHODS, DEVICES AND COMPUTER READABLE MEDIUM FOR NEW RADIO MANAGEMENT MEASUREMENT

(71) Applicant: NOKIA TECHNOLOGIES OY, Espoo (FI)

(72) Inventors: Li Zhang, Beijing (CN); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/963,134

(22) PCT Filed: Jan. 19, 2018

(86) PCT No.: PCT/CN2018/073496
§ 371 (c)(1),
(2) Date: Jul. 17, 2020

(87) PCT Pub. No.: WO2019/140653
PCT Pub. Date: Jul. 25, 2019

(65) Prior Publication Data
US 2021/0127391 A1 Apr. 29, 2021

(51) Int. Cl.
H04W 72/0446 (2023.01)
H04W 24/10 (2009.01)
(52) U.S. Cl.
CPC ....... H04W 72/0446 (2013.01); H04W 24/10 (2013.01)
(58) Field of Classification Search
CPC .......................... H04W 72/0446; H04W 24/10
See application file for complete search history.

(56) References Cited

U.S. PATENT DOCUMENTS

| | | | |
|---|---|---|---|
| 10,015,692 | B2 | 7/2018 | Marinier et al. |
| 11,044,626 | B2 | 6/2021 | Yiu et al. |
| 11,109,255 | B2 | 8/2021 | Yang et al. |
| 11,218,897 | B2 | 1/2022 | Siomina et al. |

(Continued)

FOREIGN PATENT DOCUMENTS

| | | |
|---|---|---|
| CN | 101772927 A | 7/2010 |
| CN | 102150452 A | 8/2011 |

(Continued)

OTHER PUBLICATIONS

Extended European Search Report for European Application No. 18901008.5 dated Aug. 5, 2021, 12 pages.

(Continued)

Primary Examiner — Chi H Pham
Assistant Examiner — Raul Rivas
(74) Attorney, Agent, or Firm — Alston & Bird LLP

(57) ABSTRACT

Embodiments of the disclosure provide a method, device and computer readable medium for new radio management measurement. According to embodiments of the present disclosure, the terminal device may share partially overlapped time slots between the intra-frequency measurement and the measurement gap. In this way, the priority of intra-frequency measurement and the inter-frequency measurement may be controlled by the network device. The network device may also know the terminal device behaviors and the expected measurement performances related to the behaviors.

25 Claims, 5 Drawing Sheets

(56) References Cited

U.S. PATENT DOCUMENTS

| | | | |
|---|---|---|---|
| 11,290,905 B2 | 3/2022 | Yao et al. | |
| 11,304,208 B2 | 4/2022 | Siomina | |
| 2009/0042559 A1 | 2/2009 | Choi | |
| 2009/0290502 A1* | 11/2009 | Tinnakornsrisuphap | ............... H04W 48/12 370/252 |
| 2010/0034158 A1 | 2/2010 | Meylan | |
| 2015/0304910 A1 | 10/2015 | Moogi et al. | |
| 2017/0257785 A1 | 9/2017 | Henttonen et al. | |
| 2019/0150015 A1 | 5/2019 | Wei et al. | |
| 2019/0364452 A1* | 11/2019 | Hwang | ............... H04B 17/318 |
| 2020/0120527 A1 | 4/2020 | Fan et al. | |
| 2020/0137601 A1 | 4/2020 | Siomina et al. | |
| 2020/0296612 A1 | 9/2020 | Ma et al. | |
| 2021/0076230 A1 | 3/2021 | Chen | |
| 2021/0227479 A1 | 7/2021 | Harada | |

FOREIGN PATENT DOCUMENTS

| | | |
|---|---|---|
| CN | 104813707 A | 7/2015 |
| EP | 3414933 A | 12/2018 |
| RU | 2530902 C2 | 10/2014 |
| WO | WO 2017/080229 A1 | 5/2017 |
| WO | WO 2017/138985 A1 | 8/2017 |
| WO | WO 2018/201893 A1 | 11/2018 |
| WO | WO 2019/003091 A1 | 1/2019 |
| WO | WO 2019/033058 A1 | 2/2019 |
| WO | WO 2019/091265 A1 | 5/2019 |
| WO | WO 2019/091311 A1 | 5/2019 |
| WO | WO 2019/111862 A1 | 6/2019 |

OTHER PUBLICATIONS

Samsung, "Applicability of Intra and Inter-Frequency Gap Sharing", 3GPP TSG-RAN WG4 Meeting AH-1801, R4-1800201, (Jan. 22-26, 2018), 5 pages.
"3rd Generation Partnership Project; Technical Specification Group Radio Access Network; NR; Requirements for Support of Radio Resource Management (Release 15)" 3GPP TS 38.133, V1.0.0, (Dec. 2017) pp. 1-39.
"3rd Generation Partnership Project; Technical Specification Group Radio Access Network; NR; Radio Resource Control (RRC); Protocol Specification (Release 15)", 3GPP TSA 38.331 v1.0.0, (Dec. 2017), 187 pages.
MediaTek Inc., "Discussion on Gap Sharing", 3GPP TSG-RAN WG4 AH1801 Meeting, R4-1800111, (Jan. 21-26, 2017), 13 pages.
Examiner's Report for Australian Application No. 2018403263 dated Mar. 1, 2021, 5 pages.
International Preliminary Report on Patentability for Application No. PCT/CN2018/073496, dated Jul. 21, 2020, 5 pages.
Decision To Grant A Patent For An Invention for Russian Patent Application No. 2020127516/07, dated Dec. 7, 2020, with English translation, 12 pages.
"3rd Generation Partnership Project; Technical Specification Group Radio Access Network; NR; Requirements for Support of Radio Resource Management (Release 15)" 3GPP TS 38.133, V15.0.0, (Dec. 2017) pp. 1-41.
Gap for Intra-frequency Measurement and Gap Sharing, R4-1712396, 3GPP TSG-RAN WG4 Meeting #85 (Nov. 2017) 7 pages.
International Search Report and Written Opinion for Application No. PCT/CN2018/073496 dated Sep. 29, 2018, 7 pages.
Office Action for Canadian Application No. 3088707 dated Aug. 23, 2021, 4 pages.
Office Action for Chilean Application No. 202001890 dated Nov. 15, 2021, 11 pages.
Office Action for Japanese Application No. 2020-540251 dated Oct. 25, 2021, 9 pages.
Office Action for Korean Application No. 2020-7023815 dated Jan. 3, 2022, 6 pages.

"3rd Generation Partnership Project; Technical Specification Group Radio Access Network; NR; Radio Resource Control (RRC) protocol specification (Release 15)", 3GPP TS 38.331 v15.16.0, (Dec. 2021), 542 pages.
"3rd Generation Partnership Project; Technical Specification Group Radio Access Network; NR; Radio Resource Control (RRC) protocol specification (Release 15)", 3GPP TS 38.331 v15.5.1, (Apr. 2019), 491 pages.
"3rd Generation Partnership Project; Technical Specification Group Radio Access Network; NR; Requirements for support of radio resource management (Release 15)", 3GPP 38.133 v15.16.0, (Dec. 2021), 1253 pages.
"3rd Generation Partnership Project; Technical Specification Group Radio Access Network; NR; Requirements for support of radio resource management (Release 15)", 3GPP 38.133 v15.5.0, (Mar. 2019), 892 pages.
Ericsson, "Corrections to Intrafrequency Measurement Requirements", 3GPP TSG-RAN WG4 Meeting #AH NR 1801, R4-1800187, (Jan. 22-26, 2018), 19 pages.
Office Action for ARIPO Application No. AP/P/2020/012547 dated Aug. 29, 2022, 5 pages.
Office Action for Chinese Application No. 201880087069.9 dated Aug. 12, 2022, 9 pages.
Office Action for Korean Application No. 2020-7023815 dated Sep. 13, 2022, 6 pages.
Office Action for Singapore Application No. 11202006786T dated May 13, 2022, 9 pages.
Examination Report for Indian Application No. 202027035236 dated Sep. 17, 2021, 6 pages.
Office Action for Australian Application No. 2018403263 dated Feb. 14, 2022, 4 pages.
Office Action for Chilean Application No. 202001890 dated Mar. 11, 2022, 12 pages.
Office Action for Egyptian Application No. 1039/2020 dated Sep. 11, 2022.
Decision of Final Rejection for Japanese Application No. 2020-540251 dated Jul. 11, 2022, 9 pages.
Notice of Acceptance for Australian Application No. 2018403263 dated Mar. 2, 2022, 3 pages.
Notice of Acceptance for South Africa Application No. 2020/04967 dated Oct. 3, 2022, 1 page.
Office Action for Australian Application No. 2022203398 dated Feb. 16, 2023, 4 pages.
Office Action for Canadian Application No. 3,088,707 dated Nov. 30, 2022, 2 pages.
Office Action for Chilean Application No. 202001890 dated Dec. 14, 2022, 8 pages.
Office Action for Indonesian Application No. P00202005991 dated Feb. 3, 2023, 7 pages.
Office Action for Korean Application No. 10-2020-7023815 dated Jan. 12, 2023, 11 pages.
"[Draft] LS to RAN2 on Gap Design for NR", 3GPP TSG-RAN4 Meeting #85, R4-1712359, (Nov. 27-Dec. 1, 2017), 2 pages.
"LS on LTE Measurement Gap Patterns for SSTD Measurement", 3GPP TSG-RAN WG2 #100, R2-1714227, (Nov. 27-Dec. 1, 2017), 1 page.
CATT, "Gaps for Intra-Frequency Measurement", 3GPP TSG-RAN WG4 Meeting #85, R4-1712591, (Nov. 27-Dec. 1, 2017), 2 pages.
Ericsson, "Cenfiguration of Measurement Gap in NR", 3 GPP TSG-RAN WG2 #100, R2-1713737, (Nov. 27-Dec. 1, 2017), 3 pages.
Ericsson, "Configuration of Measurement Gap in NR", 3GPP TSG-RAN WG2 #99bis, R2-1711340, (Oct. 9-13, 2017), 4 pages.
Ericsson, "Draft LS to RAN4 on Need of Measurement Gaps", 3GPP TSG-RAN WG2 Meeting #99, R2-1709295, (Aug. 21-25, 2017), 1 page.
Ericsson, "Gap Sharing Between Intra and Interfrequency", 3GPP TSG-RAN WG4 Meeting #85, R4-1712483, (Nov. 27-Dec. 1, 2017), 4 pages.
Ericsson, "Measurement Gap Configuration in EN-DC", 3GPP TSG-RAN WG2 #100, R2-1713426, (Nov. 27-Dec. 1, 2017), 2 pages.

(56) References Cited

OTHER PUBLICATIONS

Ericsson, "Measurement Priority Handling in NR", 3GPP TSG-RAN WG2 Meeting #100 on NR, R2-1713741, (Nov. 27-Dec. 1, 2017), 5 pages.
Huawei et al., "Definition of GAP Assistaed Measurement in NR", 3GPP TSG-RAN WG2 #99bis, R2-1710575, (Oct. 9-13, 2017), 3 pages.
Huawei et al., "Discussion on the Usage of Measurement Gap for Intra-Frequency Measurement", 3GPP TSG-RAN WG4 Meeting #85, R4-1713434, (Nov. 27-Dec. 1, 2017), 3 pages.
Huawei et al., "Measurement Gap Configuration in NR", 3GPP TSG-RAN WG2 #100, R2-1712551, (Nov. 27-Dec. 1, 2017), 21 pages.
Huawei et al., "Measurement Gap Configuration in NR", 3GPP TSG-RAN WG2 #99, R2-1708706, (Aug. 21-25, 2017), 3 pages.
Huawei et al., "Measurement Gap Configuration in NR", 3GPP TSG-RAN WG2 #99bis, R2-1710574, (Oct. 9-13, 2017), 3 pages.
Huawei et al., "TP on TS 38.133 for Measurement Gap Based Requirements", 3GPP TSG-RAN WG4 Meeting #85, R4-1713432, (Nov. 27-Dec. 1, 2017), 3 pages.
Intel Corporation, "Measurement Gap in NR", 3GPP TSG RAN WG2 Meeting #100, R2-1712650, (Nov. 30-Dec. 3, 2017), 8 pages.
Intel Corporation, "Measurement Gap in NR", 3GPP TSG RAN WG2 Meeting #99, R2-1708780, (Aug. 21-25, 2017), 3 pages.
Intel Corporation, "Measurement Gap in NR", 3GPP TSG RAN WG2 Meeting #99bis, R2-1710591, (Oct. 9-13, 2017), 4 pages.
Intel Corporation, "On Intra-Frequency Measurement with Gap or Interruption", 3GPP TSG-RAN4 Meeting #85, R4-1712358, (Nov. 27-Dec. 1, 2017), 3 pages.
Intel Corporation, "TP on Measurement Gap in TS 38.133 Section 9.1.2", 3GPP TSG-RAN4 Meeting #85, R4-1713937, (Nov. 27-Dec. 1, 2017), 4 pages.
Intel Corporation, "TP on Measurement Gap in TS 38.133 Section 9.1.2", 3GPP TSG-RAN4 Meeting #85, R4-1714497, (Nov. 27-Dec. 1, 2017), 4 pages.
Intel Corporation, "TP on the Requirements for Intra-Frequency Measurement with Gap in TS 38.133 Section 9.3", 3GPP TSG-RAN4 Meeting #85, R4-1712367, (Nov. 27-Dec. 1, 2017), 3 pages.
Intel, "AdHoc Minutes for NR Measurement Gap and Capability", 3GPP TSG-RAN WG4 Meeting #85, R4-1713942, (Nov. 27-Dec. 1, 2017), 20 pages.
LG Electronics Inc., "Measurement Gap Considering Beam", 3GPP TSG-RAN2 #100, R2-1713821, (Nov. 27-Dec. 1, 2017), 4 pages.
LG Electronics Inc., "Measurement Gap Considering Beam", 3GPP TSG-RAN2 #99, R2-1709131, (Aug. 21-25, 2017), 3 pages.
LG Electronics Inc., "Measurement Gap Considering Beam", 3GPP TSG-RAN2 #99bis, R2-1711683, (Oct. 9-13, 2017), 2 pages.
MediaTek Inc., "Measurement Gap Design for EN-DC", 3GPP TSG-RAN WG2 #100, R2-1712886, (Nov. 27-Dec. 1, 2017), 3 pages.
MediaTek Inc., "Measurement Gap Design for NR SA", 3GPP TSG-RAN WG2 #100, R2-1712888, (Nov. 27-Dec. 1, 2017), 5 pages.
MediaTek Inc., "Measurement Gap in NR", 3GPP TSG-RAN WG2 #100, R2-1708253, (Aug. 21-25, 2017), 3 pages.
Nokia et al., "Further Discussion on Measurement Gap Sharing", 3GPP TSG-RAN WG4 AH 1801, R4-1800358, (Jan. 22-26, 2018), 3 pages.
Nokia et al., "Intra/Inter-Frequency Definitions and Measurement Gaps", 3GPP TSG-RAN WG2 NR Adhoc #2, R2-1708471, (Jun. 27-29, 2017), 7 pages.
Nokia et al., "Measurement Gap for Intra-Frequency Measurement", 3GPP TSG-RAN WG4 #85, R4-1713099, (Nov. 27-Dec. 1, 2017), 4 pages.
Nokia et al., "Serving Cell Measurements and Measurement Gaps", 3GPP TSG-RAN WG2 #99bis, R2-1713200, (Oct. 9-13, 2017), 5 pages.
Nokia et al., "TP on Gap for Intra-Frequency Measurement", 3GPP TSG-RAN WG4 #85, R4-1713100, (Nov. 27-Dec. 1, 2017), 3 pages.
NTT Docomo, "WF 011 Gap for Intra-Frequency Measurement", 3GPP TSG-RAN WG4 RAN #85, R4-1714288, (Nov. 27-Dec. 1, 2017), 11 pages.
NTT Docomo, Inc., "Discussion and Decision", 3GPP TSG-RAN WG2 #100, R2-1713555, (Nov. 27-Dec. 1, 2017), 6 pages.
NTT Docomo, Inc., "Measurement Gap Configuration Signalling Design", 3GPP TSG-RAN2 #99bis, R2-1711751, (Oct. 9-13, 2017), 2 pages.
Oppo, "Measurement Gap Configuration Considering the Beam Sweeping", 3GPP TSG-RAN2 #99, R2-1707770, (Aug. 21-25, 2017), 3 pages.
Oppo, "NR Measurement Gap Configurations", 3GPP TSG-RAN2 #100, R2-1712243, (Nov. 27-Dec. 1, 2017), 3 pages.
Qualcomm Incorporated, "Measurement Capability and Measurement Gap Handling in EN-DC", 3GPP TSG-RAN WG2 Meeting #100, R2-1712366, (Nov. 27-Dec. 1, 2017), 4 pages.
Qualcomm Incorporated, "Measurement Capability and Measurement Gap Handling in EN-DC", 3GPP TSG-RAN WG2 Meeting #99bis, R2-1711564, (Oct. 9-13, 2017), 3 pages.
Samsung, "Measurement Gap Configuration for EN-DC", 3GPP TSG-RAN WG2 #99bis Meeting, R2-1711299, (Oct. 9-13, 2017), 3 pages.
Samsung, "Measurement Gap Configuration for EN-DC", 3GPP TSG-RAN WG2 #100 Meeting, R2-1713918, (Nov. 27-Dec. 1, 2017), 3 pages.
Samsung, "Measurement Gap for NR", 3GPP TSG-RAN Wg2 #99, Meeting, R2-1709019, (Aug. 21-25, 2017), 3 pages.
Samsung, "Scenarios of Measurement Gap Considering Bandwidth Part", 3GPP TSG RAN WG2 Meeting #100, R2-1713845, (Nov. 27-Dec. 1, 2017), 5 pages.
Samsung, "Text Proposal for a New Clause for the Handling of Measurement Gap", 3GPP TSG-RAN WG2 Meeting #100, R2-1712704, (Nov. 26-Dec. 1, 2017), 2 pages.
Samsung, "Text Proposal for a New Clause for the Handling of Measurement Gap", 3GPP TSG-RAN WG2 Meeting #99, R2-1709018, (Aug. 21-25, 2017), 2 pages.
Samsung, "Text Proposal for a New Clause for the Handling of Measurement Gap", 3GPP TSG-RAN WG2 Meeting #99bis, R2-1710955, (Oct. 9-13, 2017), 2 pages.
Speadtrum Communications, "Sliding Measurement Gap", 3GPP TSG-RAN WG2 #99bis, R2-1710375, (Oct. 9-13, 2017), 3 pages.
Vivo, "Consideration on Measurement Gap in NR", 3GPP TSG-RAN WG2 Meeting #99bis, R2-1710937, (Oct. 9-13, 2017), 4 gages.
Vivo, "Discussion on Measurement Gap" 3GPP TSG-RAN WG2 Meeting #99bis, R2-1710929, (Oct. 9-13, 2017), 2 pages.
Vivo, "Discussion on Measurement Gap", 3GPP TSG-RAN WG2 Meeting #99, R2-1708421, (Aug. 21-25, 2017), 2 pages.
ZTE Corporation, "Discussion on the Configuration of Measurement Gap", 3GPP TSG-RAN WG2 Meeting #100, R2-1712602, (Nov. 27-Dec. 1, 2017), 11 pages.
ZTE, "Consideration on the Measurement Gap", 3GPP TSG RAN WG2 #NR_99, R2-1708116, (Aug. 21-25, 2017), 6 pages.
ZTE, "Further Discussion on Intra Frequency Measurement Gap in NR", 3GPP TSG-RAN WG4 Meeting #85, R4-1713058, (Nov. 27-Dec. 1, 2017), 4 pages.
Office Action for Egyptian Application No. 1039/2020 dated Feb. 13, 2023, 5 pages.
Notice of Allowance for Chilean Application No. 2020-001890 dated Mar. 10, 2023, 2 pages.
Office Action for Chinese Application No. 201880087069.9 dated Mar. 25, 2023, 6 pages.
Office Action for Japanese Application No. 2020-540251 dated Apr. 27, 2023, 6 pages.
Office Action for Thailand Application No. 2001004018 dated Feb. 3, 2023, 8 pages.

\* cited by examiner

METHODS, DEVICES AND COMPUTER READABLE MEDIUM FOR NEW RADIO MANAGEMENT MEASUREMENT

CROSS-REFERENCE TO RELATED APPLICATIONS

This application is a national phase entry of International Application No. PCT/CN2018/073496, filed Jan. 19, 2018, the entire contents of which are incorporated herein by reference.

FIELD

Embodiments of the present disclosure generally relate to communication techniques, and more particularly, to methods, devices and computer readable medium for new radio management (RRM) measurement.

BACKGROUND

In communication systems, such as Long Term Evolved (LTE) communication systems or the $5^{th}$ generation wireless systems (5G), if a terminal device is to handover from a current serving cell to a target cell, the terminal device may measure a channel quality of the target cell. There are often two situations: (1) the target cell is at the same frequency as the current serving cell and (2) the target cell is at a different frequency from the current serving cell. Further research is still needed regarding the above two situations.

SUMMARY

Generally, embodiments of the present disclosure relate to a method for a modulation of downlink transmission and the corresponding network device and terminal device.

In a first aspect, embodiments of the present disclosure provide a method implemented at a terminal device for communication. The method comprises: receiving, from a network device, a first configuration at least indicating first set of time slots for an intra-frequency measurement of the terminal device; receiving, from the network device, a second configuration at least indicating a second set of time slots for a measurement gap of the terminal device; in response to the first and second sets of time slots being partially overlapped, determining one or more slots from the first set of time slots for the intra-frequency measurement of the terminal device based on resource control information for sharing overlapped time slots between the intra-frequency measurement and the measurement gap.

In a second aspect, embodiments of the present disclosure provide a method implemented at a network device for communication. The method comprises: transmitting, to a terminal device, a first configuration at least indicating first set of time slots for an intra-frequency measurement of the terminal device; transmitting, to the terminal device, a second configuration at least indicating a second set of time slots for a measurement gap of the terminal device; and transmitting, to the terminal device, resource control information for sharing overlapped time slots between the intra-frequency measurement and the measurement gap.

In a third aspect, embodiments of the disclosure provide a terminal device. The terminal device comprises: at least on processor; and a memory coupled to the at least one processor, the memory storing instructions therein, the instructions, when executed by the at least one processor, causing the network device to perform acts including: receiving, from a network device, a first configuration at least indicating first set of time slots for an intra-frequency measurement of the terminal device; receiving, from the network device, a second configuration at least indicating a second set of time slots for a measurement gap of the terminal device; in response to the first and second sets of time slots being partially overlapped, determining one or more slots from the first set of time slots for the intra-frequency measurement of the terminal device based on resource control information for sharing overlapped time slots between the intra-frequency measurement and the measurement gap.

In a fourth aspect, embodiments of the disclosure provide a network device. The network device comprises: at least on processor; and a memory coupled to the at least one processor, the memory storing instructions therein, the instructions, when executed by the at least one processor, causing the arbitrating terminal device to perform acts including: transmitting, to a terminal device, a first configuration at least indicating first set of time slots for an intra-frequency measurement of the terminal device; transmitting, to the terminal device, a second configuration at least indicating a second set of time slots for a measurement gap of the terminal device; and transmitting, to the terminal device, resource control information for sharing overlapped time slots between the intra-frequency measurement and the measurement gap.

In a fifth aspect, embodiments of the disclosure provide a computer readable medium. The computer readable medium stores instructions thereon, the instructions, when executed by at least one processing unit of a machine, causing the machine to implement: receiving, from a network device, a first configuration at least indicating first set of time slots for an intra-frequency measurement of the terminal device; receiving, from the network device, a second configuration at least indicating a second set of time slots for a measurement gap of the terminal device; in response to the first and second sets of time slots being partially overlapped, determining one or more slots from the first set of time slots for the intra-frequency measurement of the terminal device based on resource control information for sharing overlapped time slots between the intra-frequency measurement and the measurement gap.

In a sixth aspect, embodiments of the disclosure provide a further computer readable medium. The further computer readable medium stores instructions thereon, the instructions, when executed by at least one processing unit of a machine, causing the machine to implement: transmitting, to a terminal device, a first configuration at least indicating first set of time slots for an intra-frequency measurement of the terminal device; transmitting, to the terminal device, a second configuration at least indicating a second set of time slots for a measurement gap of the terminal device; and transmitting, to the terminal device, resource control information for sharing overlapped time slots between the intra-frequency measurement and the measurement gap.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
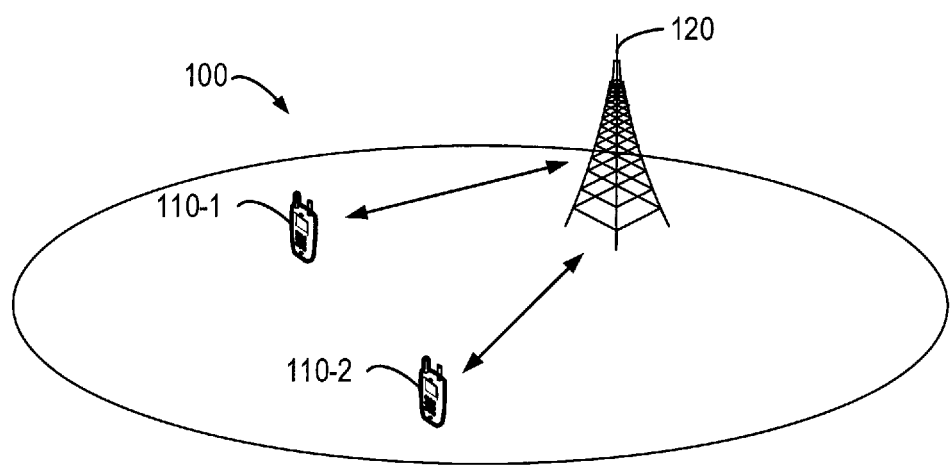
FIG. 1 illustrates a schematic diagram of a communication system according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "intra-frequency measurement" used herein refers to measuring a signal quality of a target cell if the target cell is at the same frequency as the current serving cell of the terminal device. The term "inter-frequency measurement" used herein refers to measuring a signal quality of a target cell if the target cell is at a different frequency from the current serving cell of the terminal device.

The term "measurement gap" used herein refers to a gap during which no transmission and reception happens. Since there is no signal transmission and reception during the gap, the terminal device can switch to the target cell and perform the signal quality measurement and come back to the current cell.

As described above, there are often two situations in measuring a channel quality of the target cell: (1) the target cell is at the same frequency as the current serving cell and (2) the target cell is at a different frequency from the current serving cell. Further research is still needed regarding the above two situations. The above situation (1) refers to an intra-frequency measurement and the situation (2) refers to an inter-frequency measurement.

A introduced above, the measurement gap is a gap during which no transmission and reception happens. In the situation of inter-frequency measurement, the measurement gap is needed since the terminal device needs to switch a different frequency to perform the inter-frequency measurement. In the situation of intra-frequency measurement, the measurement gap may still be needed in some scenarios. For example, even in the situation of intra-frequency measurement, if synchronization signal blocks (SSBs) of the serving cell are not completely within the terminal downlink operating bandwidth, the measurement gap is needed to allow the terminal device to switch to the frequency to be measured.

Generally speaking, the network device usually only configure one measurement pattern to the terminal device. From the view of time domain, the time slots for performing intra-measurement may be overlapped with the time slots for the measurement gap. 3GPP standard 38.133 has introduced gap sharing mechanism between the intra-frequency measurement and the inter-frequency measurement in the time slots for performing intra-measurement are fully overlapped with the time slots for the measurement gap. However, it has not been discussed that how the overlapped time slots being shared between the intra-frequency and the measurement gap if the time slots for performing intra-measurement are partially overlapped with the time slots for the measurement gap.

In order to at least in part solve above and other potential problems, embodiments of the present disclosure provide a salutation for new radio management measurement. Now some example embodiments of the present disclosure are described below with reference to the figures. However, those skilled in the art would readily appreciate that the detailed description given herein with respect to these figures is for explanatory purpose as the present disclosure extends beyond theses limited embodiments.

FIG. 1 illustrates a schematic diagram of a communication system in which embodiments of the present disclosure can be implemented. The communication system 100, which is a part of a communication network, includes a network device 120 and one or more terminal devices 110-1 and 110-2. It is to be understood that the communication system 100 may include any suitable number of terminal devices. It should be noted that the communication system 100 may also include other elements which are omitted for the purpose of clarity. The network device 120 may communicate with the terminal devices 110. It is to be understood that the number of network devices and terminal devices shown in FIG. 1 is given for the purpose of illustration without suggesting any limitations. The communication system 100 may include any suitable number of network devices and terminal devices.

Communications in the communication system 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
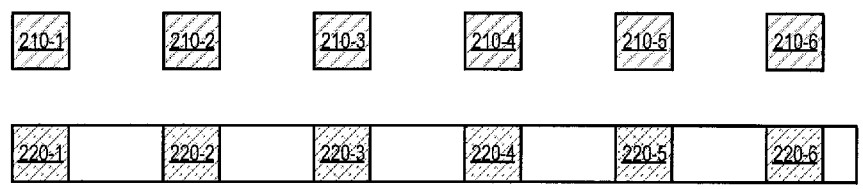
FIG. 2 illustrates a schematic diagram of fully overlapping in time slots between the intra-frequency measurement and the measurement gap.

FIG. 2 illustrates a schematic diagram of fully overlapping in time slots between the intra-frequency measurement and the measurement gap. The time slot set 210 for the measurement may include time slots 210-1, 210-2, 210-3, 210-4, 210-5 and 210-6 It is to be understood that the time slot set 210 may include any suitable number of time slots. The time slots set 220 for intra-frequency measurements may include time slots 220-1, 220-2, 220-3, 220-4, 220-5 and 220-6. It is to be understood that the time slot set 220 may include any suitable number of time slots. As shown in FIG. 2, the time slot set 210 are fully overlapped with the time slot set 220.

As described above, 3GPP standard 38.133 has introduced gap sharing mechanism between the intra-frequency measurement and the inter-frequency measurement in the time slots for performing intra-measurement are fully overlapped with the time slots for the measurement gap. The network device may transmit a parameter "X" (for example, gap sharing factor) via a radio resource control (RRC) signaling to indicate how the fully overlapped time slots shared between the intra-frequency measurement and the measurement gap. Table 1 below in the 3GPP standard 38.133 defines the parameter "X."

TABLE 1

| Network signaling ParameterName | Value of X (%) |
|---|---|
| "00" | $X_1$ |
| "01" | $X_2$ |
| "10" | $X_3$ |
| "11" | $X_4$ |

By way of example, if the parameter "00" is transmitted via the RRC signaling, $X_1$% of the fully overlapped time slots are to be used for the intra-frequency measurement. If the parameter "01" is transmitted via the RRC signaling, $X_2$% of the fully overlapped time slots are to be used for the intra-frequency measurement. If the parameter "10" is transmitted via the RRC signaling, $X_3$% of the fully overlapped time slots are to be used for the intra-frequency measurement. If the parameter "11" is transmitted via the RRC signaling, $X_4$% of the fully overlapped time slots are to be used for the intra-frequency measurement. In this scenario, the performance of intra-frequency defined in section 9.2 of the 3GPP standard 38.133 is scaled by $K_{intra}=1/X*100$ and the performance of inter-frequency defined in section 9.2 of the 3GPP standard 38.133 is scaled by $K_{inter}=1/(100-X)*100$.

Figure 3:
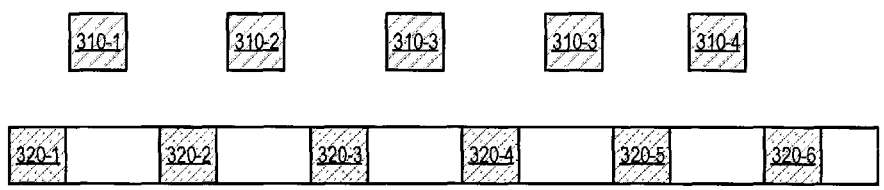
FIG. 3 illustrates a schematic diagram of non-overlapping in time slots between the intra-frequency measurement and the measurement gap.

FIG. 3 illustrates a schematic diagram of non-overlapping in time slots between the intra-frequency measurement and the measurement gap. The time slot set 310 for the measurement gap may include time slot 310-1, 310-2, 310-3, 310-4, 310-5 and 310-6. It is to be understood that the time slot set 310 may include any suitable number of time slots. The time slot set 320 for intra-frequency measurements may include time slot 320-1, 320-2, 320-3, 320-4, 320-5 and 320-6. It is to be understood that the time slot set 320 may include any suitable number of time slots. As shown in FIG. 3, time slot set 310 is non-overlapped with time slot set 320. In such situation, there is no need sharing time slots between the intra-frequency measurement and the measurement gap. Due to signaling overheads, the network may unlikely configure non-overlapping in time slots between the intra-frequency measurement and the measurement gap.

Figure 4:
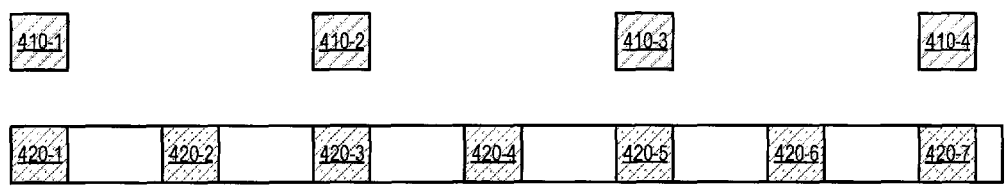
FIG. 4 illustrates a schematic diagram of partially overlapping in time slots between the intra-frequency measurement and the measurement gap according to embodiments of the present disclosure.
Figure 5:
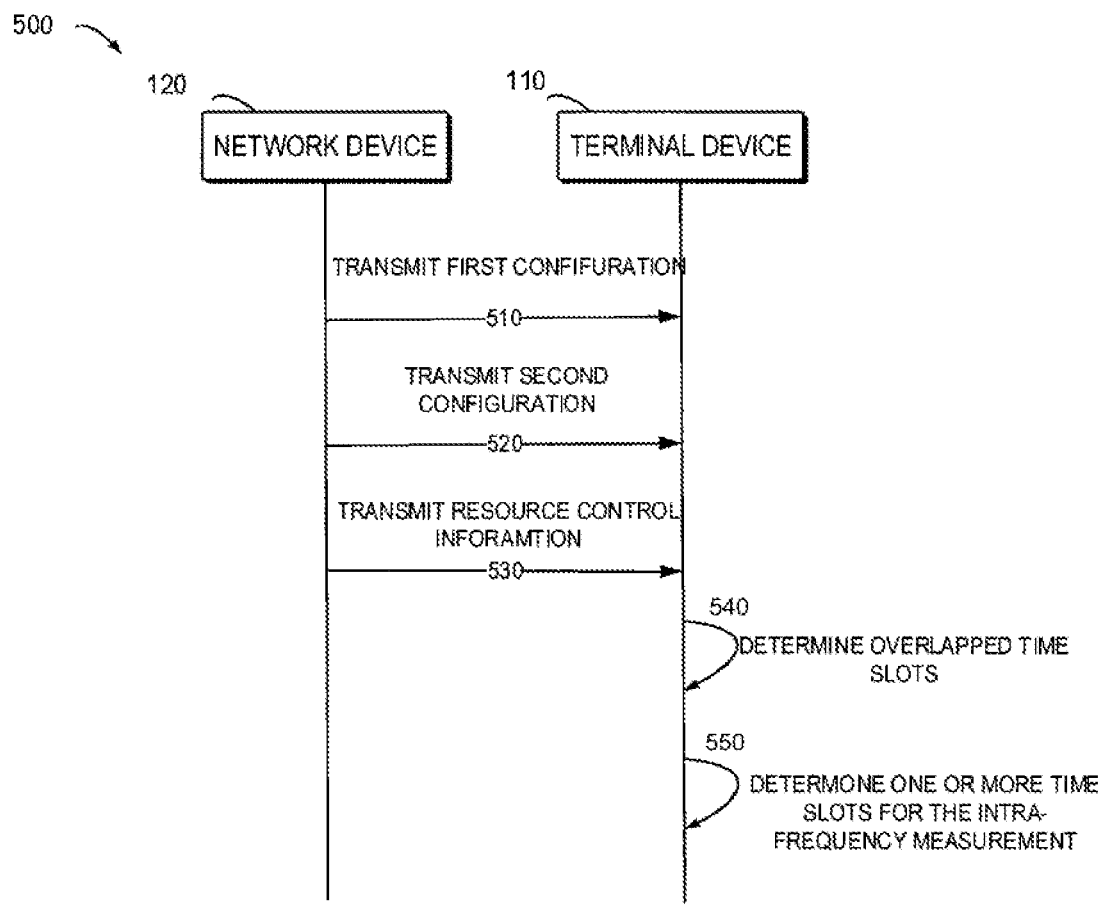
FIG. 5 illustrates an interaction operation between a terminal device and a network device according to embodiments of the present disclosure.

FIG. 4 illustrates a schematic diagram of partially overlapping in time slots between the intra-frequency measurement and the measurement gap according to embodiments of the present disclosure. FIG. 5 illustrates an example interaction diagram of operation 500 between the terminal device 110 and the network device 120 according to embodiments of the present disclosure. The interaction operation 500 will be described with reference to FIG. 4 below.

In some embodiments, the terminal device 110 may measure a channel quality of a target cell for handover. The terminal device 110 may measure reference signals strength to obtain information of the channel quality of the target cell. For example, the terminal device 110 may obtain the channel quality of the target cell for handover based on reference signal receiving power (RSRP). As mentioned above, there are two types of measurements, that is, the intra-frequency measurement and inter-frequency measurement. In the situation of inter-frequency measurement, the measurement gap is needed since the terminal device needs to switch a different frequency to perform the inter-frequency measurement. In the situation of intra-frequency measurement, the measurement gap may still be needed in some scenarios.

The network device 120 transmits 510 a configuration for the intra-frequency measurement (referring to as "a first configuration") to the terminal device 110. In an example embodiment, the first configuration may be transmitted via a RRC signaling. By way of example, the network device 120 may send SS block based RRM measurement timing configuration (SMTC) to the terminal device 110 for intra-frequency measurement. In some embodiments, the first configuration may include information of a measuring window for the intra-frequency measurement. In an example embodiment, the first configuration may indicate duration of the measuring window. For example, the first configuration may indicate that duration of one measuring window is 5 ms. It is to be understood that the duration of one measuring window may be any suitable value. Additionally or alternatively, the first configuration may include the periodicity of the measuring window. That is to say, the first configuration may indicate how long the measuring windows should be repeated.

In some embodiments, the first configuration may also indicate the starting position of the measured window in the time slots of the serving cell for intra-frequency measurement. For example, since every cell has its own clock, the first configuration may indicate a time slot at which the first measured window starts. By way of example, the first configuration may indicate that the measuring window is to start from the $100^{th}$ time slot. The first configuration indicates a set of time slots 420 (referring to as "first set of time slots") is to be used for performing the intra-frequency measurement.

In a further embodiment, the terminal device 110 may determine the first set of time slots 420 based on the information of the measuring window. For example, the information of the measuring window may include that the duration of one measuring window is 5 ms and the measuring window may be repeated every 40 ms. The information of the measuring window may also include that the measuring window starts from the $100^{th}$ time slot. In this example, the terminal device 110 may determine time slots 420-1, 420-2, 420-3, 420-4, 420-5, 420-6 and 420-7 as the first set of time slots 420. It is to be understood that the first set of time slots 420 may include any suitable number of time slots. Each of the time slots 420-1, 420-2, 420-3, 420-4, 420-5, 420-6 and 420-7 has duration of 5 ms and the time interval between any adjacent two of them is 40 ms.

In some embodiment, the network device 120 may also transmit configuration for inter-frequency measurement. By way of example, the network device 120 may send SS block based RRM measurement timing configuration (SMTC) to the terminal device 110 for inter-frequency measurement via a RRC signaling. In some embodiments, the configuration may include information of a measuring window for the inter-measurement. In an example embodiment, the configuration may indicate duration of the measuring window. For example, the configuration may indicate that duration of one measuring window is 40 ms. It is to be understood that the duration of one measuring window may be any suitable value. Additionally or alternatively, the configuration may include the periodicity of the measuring window. That is to say, the configuration may indicate how long the measuring windows should be repeated. In some embodiments, the configuration may also indicate the starting position of the measured window in the time slots of the serving cell for inter-frequency measurement.

The network device 120 transmits 520 a configuration for the measurement gap (referring to as "a second configuration") to the terminal device 110. In an example embodiment, the second configuration may be transmitted via a RRC signaling. By way of example, the second configuration may indicate duration of the measurement gap. For example, the second configuration may indicate that duration of one measurement gap is 40 ms or 80 ms. It is to be understood that the duration of one measurement gap may be any suitable value. Additionally or alternatively, the second configuration may include the periodicity of the measurement gap. That is to say, the second configuration may indicate how long the measurement gap should be repeated.

In some embodiments, the second configuration may also indicate the starting position of the measurement gap in the time slots of the serving cell. For example, since every cell has its own clock, the second configuration may indicate a time slot at which the first measurement gap starts.

In a further embodiment, the terminal device 110 may determine the second set of time slots 410 based on the second configuration for the measurement gap. For example, the second configuration may include that the duration of one measurement gap is 6 ms and the measurement gap may be repeated every 80 ms. The second configuration may also include that the first measurement gap starts from the $100^{th}$ time slot. In this example, the terminal device 110 may determine time slots 410-1, 410-2, 410-3 and 410-4 as the second set of time slots 410. It is to be understood that the second set of time slots 410 may include any suitable number of time slots. Each of the time slots 410-1, 410-2, 410-3 and 410-4 has duration of 6 ms and the time interval between any adjacent two of them is 80 ms.

The network device 120 transmits 530 resource control information for sharing overlapped time slots between the intra-frequency measurement and the measurement gap. In some embodiments, the resource control information may be transmitted together with the first configuration or the second configuration. In other embodiment, the resource control information may be transmitted as a new signaling defined in RRC signaling.

In some embodiments, the resource control information may include a parameter for sharing the overlapped time slots. In an example embodiment, the resource control information may include the parameter "X" (for example, gap sharing factor) shown in Table 1. Alternatively, the resource control information may include another parameter which is defined in a new signaling and is different from the above parameter "X".

In other embodiments, the resource control information may other information that may affect the behavior of the terminal device 110. For example, the resource control information may include the number of frequencies at which the intra-frequency measurement is performed. The resource control information may also include the number of frequencies at which the inter-frequency measurement is performed. Alternatively, the resource control information may include an overlapping ratio between the first set of time slots 420 and the second set of time slots 410. In a further example, the resource control information may include information regarding whether the intra-frequency measurement is performed without interrupting data scheduling. As described above, the intra-frequency measurement also needs the measurement gap in some situations. For example, the intra-frequency measurement on high frequency bands may lead to interruption to data scheduling in the serving cell. In such situation, the terminal device 110 may perform the intra-frequency measurement during the time slots that are overlapped with the measurement gap. In this way, since the terminal device 110 does not use the time slots which are not overlapping with the measurement gap for intra-frequency measurement, those time slots can still be used for data scheduling, so the total interruption is reduced.

The terminal device 110 determines 540 whether the first set of time slots 420 and the second set of time slots 410 are partially overlapped. By way of example, the terminal device 110 may determine that time slots 410-1 and 420-1, time slots 410-2 and 420-3, time slots 41-03 and 420-5, and time slots 410-4 and 4207 are overlapped.

The terminal device 110 determines 550 one or more time slots for intra-frequency measurement based on the resource control information. In this way, the priority of intra-frequency measurement and the inter-frequency measurement may be controlled by the network device. The network device may also know the terminal device behaviors and the expected measurement performances related to the behaviors.

In some embodiments, the terminal device 110 may determine a parameter for sharing the overlapped time slots. By way of example, the terminal device 110 may extract a specific parameter from the resource control information. As described above, in an example embodiment, the resource control information may include the parameter "X" (for example, gap sharing factor) as introduced in the 3GPP standards 38.133. For example, if the value of the parameter "X" (gap sharing factor) is 50%, the terminal device 110 may determine 50% of the overlapped time slots are used for intra-frequency measurement. In this example, the terminal device 110 may determine that time slots 420-2, 420-3, 420-4, 420-6 and 420-7 for intra-frequency measurement. In this situation, the intra-frequency measurement requirement is scaled by a factor of $1/(Y+Z*(1-Y))$, where Z is the gap sharing factor between the intra-frequency and the inter-frequency measurements and Y is the percentage of time slots for the intra-frequency not overlapped with the time slots for the measurement gap.

In a further embodiment, the resource control information may not include the parameter "X". The terminal device 110 may only use the time slots in the first set of time slots 420 which are not overlapped with the second set of time slots 410 for intra-frequency. For example, the terminal device may determine time slots 420-2, 420-4 and 420-6 for intra-frequency measurement. In this situation, the intra-frequency measurement requirement is scaled by a factor of $1/Y$, where Y is the percentage of time slots for the intra-frequency not overlapped with the time slots for the measurement gap.

Alternatively, the resource control information may the resource control information may include another parameter which is defined in a new signaling for sharing the overlapped time slots. For example, the resource control information may include the parameter indicating that none of the overlapped time slots are used for intra-frequency measurement. In other embodiment, the resource control information may include the parameter indicating that a certain percentage of the overlapped time slots are used for intra-frequency measurement.

In some embodiments, the terminal device 110 may determine the parameter for sharing the overlapped time slots for intra-frequency measurement based on information included in the resource control information. By way of example, the resource control information may the number of frequencies at which the intra-frequency measurement is performed and number of frequencies at which the inter-frequency measurement is performed. The terminal device 110 may determine a parameter indicating the percentage of the overlapped time slots to be used for the intra-frequency measurement based on the above numbers of frequencies. If the number of frequencies at which the intra-frequency measurement is smaller than the number of frequencies at which the inter-frequency measurement is performed, the terminal device 110 may determine that the percentage of the overlapped time slots for intra-frequency measurement is smaller than the percentage of the overlapped time slots for the measurement gap.

In another embodiment, the resource control information may include an overlapping ratio between the first set of time slots 420 and the second set of time slots 410. The terminal device 110 may determine a parameter indicating the percentage of the overlapped time slots to be used for the intra-frequency measurement based on the overlapping ratio. If the overlapping ratio is smaller than a predetermined threshold, the terminal device 110 may determine that the percentage of the overlapped time slots for intra-frequency measurement is smaller than the percentage of the overlapped time slots for the measurement gap.

In a further example, the resource control information may include information regarding whether the intra-frequency measurement is performed without interrupting data scheduling. As described above, the intra-frequency measurement also needs the measurement gap in some situations. For example, the intra-frequency measurement on high frequency bands may lead to interruption to data scheduling in the serving cell. In such situation, the terminal device 110 may determine that the overlapped time slots are used for intra-frequency measurement based on the information. In this way, since the terminal device 110 does not use the time slots which are not overlapping with the measurement gap for intra-frequency measurement, those time slots can still be used for data scheduling, so the total interruption is reduced.

Figure 6:
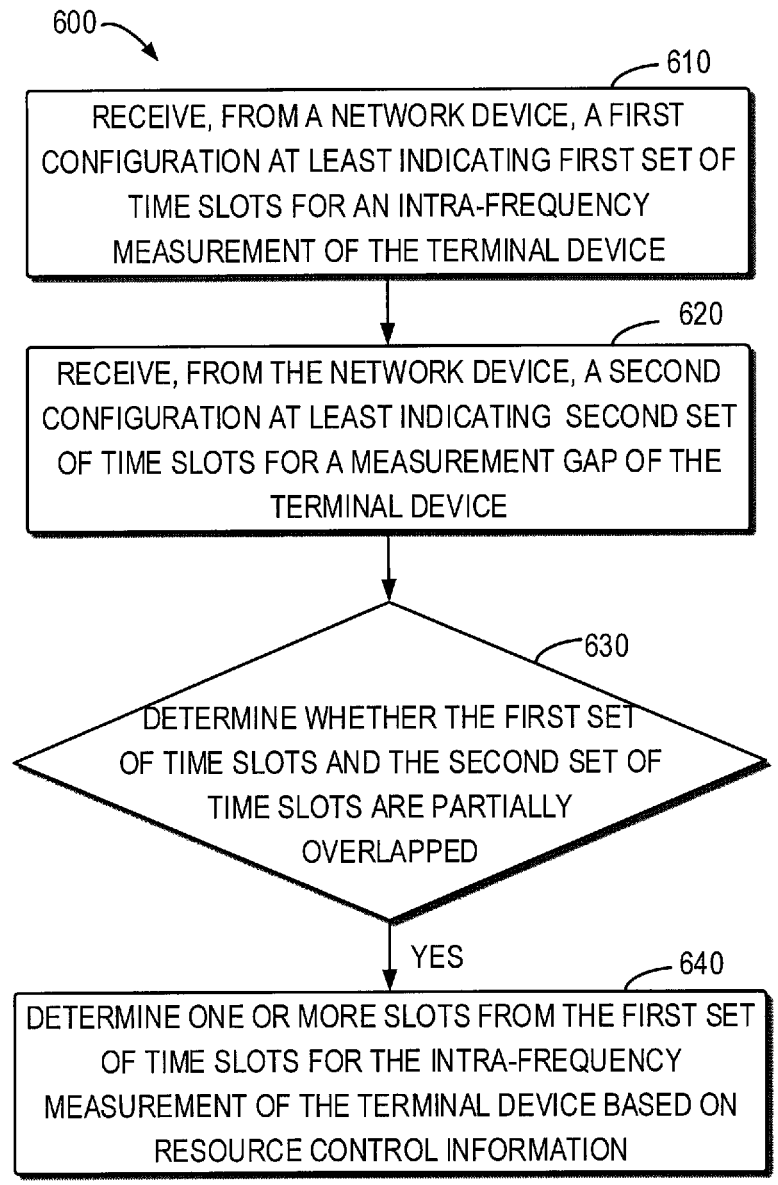
FIG. 6 illustrates a flow chart of a method implemented at a terminal device for communication according to embodiments of the present disclosure.

FIG. 6 illustrates a flow chart of method 600 in accordance with an example of the present disclosure. The method 600 may be implemented at the terminal device 110.

At block 610, the terminal device 110 receives a first configuration for an intra-frequency measurement of the terminal device 110 from the network device 120. The first configuration indicates first set of time slots 420 for the intra-frequency measurement. In an example embodiment, the first configuration may be received via the RRC signaling.

In some embodiments, the first configuration may include information of a measuring window for the intra-frequency measurement. In an example embodiment, the first configuration may indicate duration of the measuring window. Additionally or alternatively, the first configuration may include the periodicity of the measuring window. That is to say, the first configuration may indicate how long the measuring windows should be repeated. In some embodiments, the first configuration may also indicate the starting position of the measured window in the time slots of the serving cell for intra-frequency measurement.

At block 620, the terminal device 110 receives a second configuration for a measurement gap of the terminal device 110 from the network device 120. The second configuration indicates second set of time slots 410 for the measurement gap. In an example embodiment, the second configuration may be transmitted via a RRC signaling.

By way of example, the second configuration may indicate duration of the measurement gap. Additionally or alternatively, the second configuration may include the periodicity of the measurement gap. That is to say, the second configuration may indicate how long the measurement gap should be repeated. In some embodiments, the second configuration may also indicate the starting position of the measurement gap in the time slots of the serving cell.

At block 630, the terminal device 110 determines whether the first set of time slots 420 and the second set of time slots 410 are partially overlapped. If the first set of time slots 420 and the second set of time slots 410 are partially overlapped, at block 640, the terminal device 110 determines one or more slots from the first set of time slots 420 for the intra-frequency measurement of the terminal device 120 based on resource control information. In some embodiments, the terminal device 110 may determine a parameter for sharing the overlapped time slots based on the resource control information. The terminal device 110 may determine the one or more time slots based on the parameter.

In some embodiments, the resource control information may be transmitted together with the first configuration or the second configuration. In other embodiment, the resource control information may be transmitted as a new signaling defined in RRC signaling.

In some embodiments, the resource control information may include a parameter for sharing the overlapped time slots. In an example embodiment, the resource control information may include the parameter "X" (for example, gap sharing factor) as introduced in the 3GPP standards 38.133. Alternatively, the resource control information may include another parameter which is defined in a new signaling and is different from the above parameter "X".

In other embodiments, the resource control information may other information that may affect the behavior of the terminal device 110. For example, the resource control information may include the number of frequencies at which the intra-frequency measurement is performed. The resource control information may also include the number of frequencies at which the inter-frequency measurement is performed. Alternatively, the resource control information may include an overlapping ratio between the first set of time slots 420 and the second set of time slots 410. In other example, the resource control information may include information about whether the intra-frequency measurement is performed without interrupting data scheduling.

Figure 7:
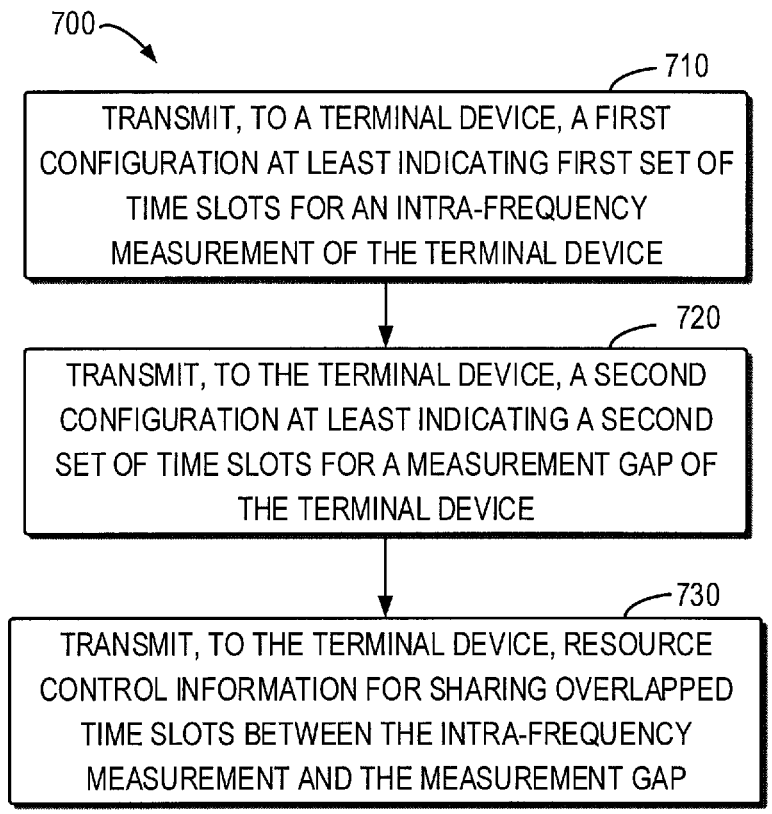
FIG. 7 illustrates a flow chart of a method implemented at a network device for communication according to embodiments of the present disclosure.

FIG. 7 illustrates a flow chart of method 700 in accordance with an example of the present disclosure. The method 700 may be implemented at the network device 120.

At block 710, the network device 120 transmits a first configuration for an intra-frequency measurement of the terminal device 110 to the terminal device 110. The first configuration indicates first set of time slots 420 for the intra-frequency measurement. In an example embodiment, the first configuration may be received via the RRC signaling.

In some embodiments, the first configuration may include information of a measuring window for the intra-frequency measurement. In an example embodiment, the first configuration may indicate duration of the measuring window. Additionally or alternatively, the first configuration may include the periodicity of the measuring window. That is to say, the first configuration may indicate how long the measuring windows should be repeated. In some embodiments, the first configuration may also indicate the starting position of the measured window in the time slots of the serving cell for intra-frequency measurement.

At block 720, the network device 120 transmits a second configuration for a measurement gap of the terminal device 110 to the terminal device 110. The second configuration indicates second set of time slots 410 for the measurement gap. In an example embodiment, the second configuration may be transmitted via a RRC signaling.

By way of example, the second configuration may indicate duration of the measurement gap. Additionally or alternatively, the second configuration may include the periodicity of the measurement gap. That is to say, the second configuration may indicate how long the measurement gap should be repeated. In some embodiments, the second configuration may also indicate the starting position of the measurement gap in the time slots of the serving cell.

At block 730, the network device 120 transmits the resource control information for sharing overlapped time slots between the intra-frequency measurement and the measurement gap to the terminal device 110. In some embodiments, the resource control information may be transmitted together with the first configuration or the second configuration. In other embodiment, the resource control information may be transmitted as a new signaling defined in RRC signaling.

In some embodiments, the resource control information may include a parameter for sharing the overlapped time slots. In an example embodiment, the resource control information may include the parameter "X" (for example, gap sharing factor) as introduced in the 3GPP standards 38.133. Alternatively, the resource control information may include another parameter which is defined in a new signaling and is different from the above parameter "X".

In other embodiments, the resource control information may other information that may affect the behavior of the terminal device 110. For example, the resource control information may include the number of frequencies at which the intra-frequency measurement is performed. The resource control information may also include the number of frequencies at which the inter-frequency measurement is performed. Alternatively, the resource control information may include an overlapping ratio between the first set of time slots 420 and the second set of time slots 410. In other example, the resource control information may include information about whether the intra-frequency measurement is performed without interrupting data scheduling.

Figure 8:
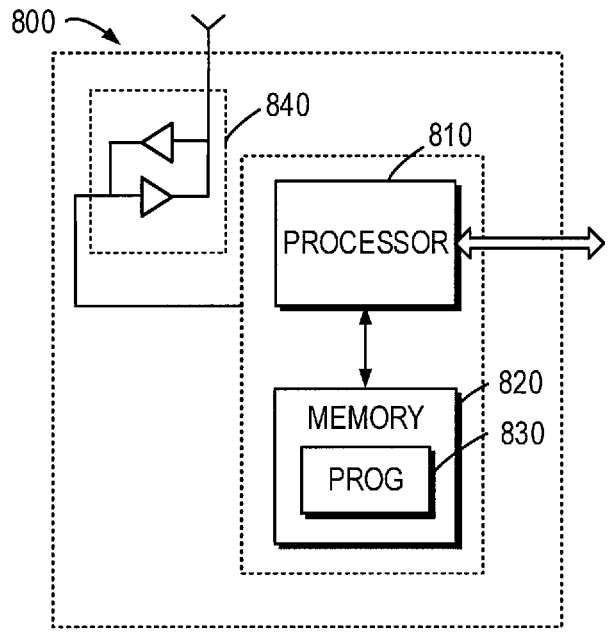
FIG. 8 illustrates a schematic diagram of a device according to embodiments of the present disclosure.

FIG. 8 is a simplified block diagram of a device 800 that is suitable for implementing embodiments of the present disclosure. The device 800 may be implemented at the network device 120. The device 800 may also be implemented at the terminal device 110. As shown, the device 800 includes one or more processors 810, one or more memories 820 coupled to the processor(s) 810, one or more transmitters and/or receivers (TX/RX) 840 coupled to the processor 810.

The processor 810 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 820 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements.

The program 830 is assumed to include program instructions that, when executed by the associated processor 810, enable the device 800 to operate in accordance with the embodiments of the present disclosure, as discussed herein with reference to FIGS. 4 to 7. That is, embodiments of the present disclosure can be implemented by computer software executable by the processor 810 of the device 800, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method implemented at a terminal device for communication, the method comprising:
receiving, from a network device, a first configuration indicating at least a first set of time slots for an intra-frequency measurement;
receiving, from the network device, a second configuration indicating at least a second set of time slots for a measurement gap;
receiving, from the network device, resource control information comprising an indication regarding whether to share overlapping time slots between the first set of time slots for the intra-frequency measurement and the second set of time slots for the measurement gap; and
in response to the first and second sets of time slots only partially overlapping, determining, based on the resource control information, one or more time slots from the first set of time slots to be used for the intra-frequency measurement of the terminal device that do not overlap with any time slot from the second set of time slots for the measurement gap of the terminal device.

2. The method of claim 1, wherein the first configuration indicates at least one of:
duration of a measuring window,
a periodicity of the measuring window, or
a beginning position of the measuring window in time slots.

3. The method of claim 1, wherein the second configuration indicates at least one of:
duration of a measurement gap,
a periodicity of the measurement gap, or
a beginning position of the measurement gap in time slots.

4. The method of claim 1, wherein the second configuration is received via radio resource control (RRC) signaling.

5. The method of claim 1, wherein at least one of the first configuration is received via radio resource control (RRC) signaling.

6. A terminal device, comprising:
at least one processor; and
a memory coupled to the at least one processor, the memory storing instructions therein, the instructions, when executed by the at least one processor, causing the terminal device at least to:
receive, from a network device, a first configuration indicating at least a first set of time slots for an intra-frequency measurement;
receive, from the network device, a second configuration indicating at least a second set of time slots for a measurement gap;
receive, from the network device, resource control information comprising an indication regarding whether to share overlapping time slots between the first set of time slots for the intra-frequency measurement and the second set of time slots for the measurement gap; and
in response to the first and second sets of time slots only partially overlapping, determine, based on the resource control information, one or more time slots from the first set of time slots to be used for the intra-frequency measurement of the apparatus that do not overlap with any time slot from the second set of time slots for the measurement gap of the apparatus.

7. The terminal device of claim 6, wherein the first configuration indicates at least one of:
duration of a measuring window,
a periodicity of the measuring window, or
a beginning position of the measuring window in time slots.

8. The terminal device of claim 6, wherein the second configuration indicates at least one of:
duration of the measurement gap,
a periodicity of the measurement gap, or
a beginning position of the measurement gap in time slots.

9. The terminal device of claim 6, wherein the second configuration is received via radio resource control (RRC) signaling.

10. The terminal device of claim 6, wherein the first configuration is received via radio resource control (RRC) signaling.

11. A computer readable medium storing instructions thereon, the instructions, when executed by at least one processing unit of a machine, causing the machine to:
receive, from a network device, a first configuration indicating at least a first set of time slots for an intra-frequency measurement;
receive, from the network device, a second configuration indicating at least a second set of time slots for a measurement gap;
receive, from the network device, resource control information comprising an indication regarding whether to share overlapping time slots between the first set of time slots for the intra-frequency measurement and the second set of time slots for the measurement gap; and
in response to the first and second sets of time slots only partially overlapping, determine, based on the resource control information, one or more time slots from the first set of time slots to be used for the intra-frequency measurement of the terminal device that do not overlap any time slot from the second set of time slots for the measurement gap of the terminal device.

12. The computer readable medium of claim 11, wherein the first configuration indicates at least one of:
duration of a measuring window,
a periodicity of the measuring window, or
a beginning position of the measuring window in time slots.

13. The computer readable medium of claim 11, wherein the second configuration indicates at least one of:
duration of the measurement gap,
a periodicity of the measurement gap, or
a beginning position of the measurement gap in time slots.

14. The computer readable medium of claim 11, wherein at least one of the first configuration or the second configuration is received via radio resource control (RRC) signaling.

15. The computer readable medium of claim 11, wherein the instructions, when executed by at least one processing unit of the machine, further cause the machine to determine the one or more time slots based on resource control information signaled from the network device for the intra-frequency measurement.

16. The computer readable medium of claim 15, wherein the instructions, when executed by at least one processing unit of the machine, cause the machine to receive the resource control information together with the first configuration or the second configuration.

17. The method of claim 1, further comprising:
receiving, from the network device, the resource control information, the resource control information comprising an indication regarding sharing overlapping time slots between the intra-frequency measurement and the measurement gap.

18. The method of claim 17, further comprising:
in an instance in which the first set of time slots only partially overlaps with the second set of time slots, determining, based upon the resource control information received from the network device, one or more time slots in the first set of time slots which do not overlap with any time slot in the second set of time slots; and
using the one or more time slots in the first set of time slots which do not overlap with any time slot in the second set of time slots for the intra-frequency measurement.

19. The method of claim 17, wherein the resource control information received from the network device for the intra-frequency measurement indicates one or more of: a parameter for sharing time slots which overlap between the first and second sets of time slots, a number of frequencies at which the intra-frequency measurement should be performed, a number of frequencies at which an inter-frequency measurement should be performed, an overlapping ratio between the first and second sets of time slots, whether the intra-frequency measurement should be performed without interrupting data scheduling, or whether the measurement gap is needed for inter-frequency measurement.

20. The terminal device of claim 6, wherein the memory stores additional instructions that, when executed by the at least one processor, cause the terminal device at least to:
receive, from the network device, the resource control information, the resource control information comprising an indication regarding sharing overlapping time slots between the intra-frequency measurement and the measurement gap.

21. The terminal device of claim 20, wherein the memory stores additional instructions that, when executed by the at least one processor, cause the terminal device at least to:
in an instance in which the first set of time slots only partially overlaps with the second set of time slots, determine, based upon the resource control information received from the network device, one or more time slots in the first set of time slots which do not overlap with any time slot in the second set of time slots; and
use the one or more time slots in the first set of time slots which do not overlap with any time slot in the second set of time slots for the intra-frequency measurement.

22. The terminal device of claim 20, wherein the resource control information received from the network device for the intra-frequency measurement indicates one or more of: a parameter for sharing time slots which overlap between the first and second sets of time slots, a number of frequencies at which the intra-frequency measurement should be performed, a number of frequencies at which an inter-frequency measurement should be performed, an overlapping ratio between the first and second sets of time slots, whether the intra-frequency measurement should be performed without interrupting data scheduling, or whether the measurement gap is needed for inter-frequency measurement.

23. The computer readable medium of claim 11, wherein the instructions, when executed by at least one processing unit of a machine, further cause the machine to:
receive, from the network device, the resource control information, the resource control information comprising an indication regarding sharing overlapping time slots between the intra-frequency measurement and the measurement gap.

24. The computer readable medium of claim 23, wherein the instructions, when executed by at least one processing unit of a machine, further cause the machine to:
in an instance in which the first set of time slots only partially overlaps with the second set of time slots, determine, based upon the resource control information received from the network device, one or more time slots in the first set of time slots which do not overlap with any time slot in the second set of time slots; and
use the one or more time slots in the first set of time slots which do not overlap with any time slot in the second set of time slots for the intra-frequency measurement.

25. The computer readable medium of claim 23, wherein the resource control information received from the network device for the intra-frequency measurement indicates one or more of: a parameter for sharing time slots which overlap between the first and second sets of time slots, a number of frequencies at which the intra-frequency measurement should be performed, a number of frequencies at which an inter-frequency measurement should be performed, an overlapping ratio between the first and second sets of time slots, whether the intra-frequency measurement should be performed without interrupting data scheduling, or whether the measurement gap is needed for inter-frequency measurement.

\* \* \* \* \*

UNITED STATES PATENT AND TRADEMARK OFFICE
CERTIFICATE OF CORRECTION

PATENT NO. : 11,737,060 B2
APPLICATION NO. : 16/963134
DATED : August 22, 2023
INVENTOR(S) : Li Zhang et al.

It is certified that error appears in the above-identified patent and that said Letters Patent is hereby corrected as shown below:

In the Drawings

In sheet 3 of 5, FIG. 5, reference numeral 510, Line 1, delete "CONFIFURATION" and insert -- CONFIGURATION --, therefor.

In sheet 3 of 5, FIG. 5, reference numeral 530, Line 2, delete "INFORAMTION" and insert -- INFORMATION --, therefor.

In sheet 3 of 5, FIG. 5, reference numeral 550, Line 1, delete "DETERMONE" and insert -- DETERMINE --, therefor.

Signed and Sealed this
Nineteenth Day of March, 2024

Katherine Kelly Vidal
*Director of the United States Patent and Trademark Office*